United States Patent Office 3,655,672
Patented Apr. 11, 1972

3,655,672
QUINOPHTHALONE DYESTUFFS AND PROCESS FOR PREPARING THEM
Ernst Spietschka, Oberauroff, and Friedrich Ische, Kelkheim, Taunus, Germany, assignors to Farbwerke Hoechst Aktiengesellschaft vormals Meister Lucius & Bruning, Frankfurt am Main, Germany
No Drawing. Filed May 19, 1969, Ser. No. 825,971
Claims priority, application Germany, May 24, 1968,
P 17 69 437.0
Int. Cl. C07d 33/38
U.S. Cl. 260—289 QP                 5 Claims

ABSTRACT OF THE DISCLOSURE 3-hydroxy-quinophthalone dyestuffs substituted in the 4-position by an ether or thioether group, and a process for preparing them. Said dyestuffs yield on synthetic fibrous materials, especially those from polyethylene terephthalates, yellow dyeings having good fastness to light, wet processing and solvents and a remarkably good fastness to thermofixation and ironing.

---

The present invention concerns quinophthalone dyestuffs corresponding to the general formula

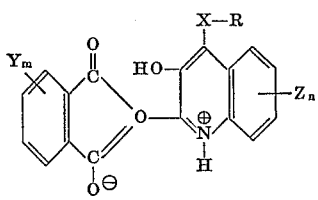

in which X represents an oxygen or sulfur atom, R represents an aryl radical, an aliphatic or cycloaliphatic radical or a heterocyclic ring, Y represents a hydrogen or halogen atom, a nitro group or a phenyl radical, Z stands for a hydrogen or halogen atom, $m$ is an integer from 1 to 4 and $n$ is 1 or 2. More particularly, in compounds according to this invention, R is phenyl or phenyl substituted by one or two members selected from the group consisting of alkyl having 1 to 4 carbon atoms, alkoxy having 1 to 4 carbon atoms, chlorine, bromine, fluorine, nitro, hydroxy, carbonamide, benzyl, formyl, carbalkoxy, carboxy, phenoxy, phenyl, hydroxy, lower alkoxy, lower dialkylamino, fluoro lower alkoxy, fluoro-alkyl having 1 to 12 carbon atoms, hydroxy alkyl, lower alkoxy lower alkyl, hydroxy lower alkoxy lower alkyl, chloro lower alkyl, cyano-lower alkyl, lower dialkylamino lower alkyl, cyclohexyl lower alkyl, chlorophenylsulfonyl lower alkyl, phenyl sulfonyl lower alkyl, morpholino lower alkyl, cyclohexyl, naphthyl and chloronaphthyl, Y is hydrogen, chlorine, bromine, nitro or phenyl, Z is hydrogen, chlorine or bromine, $m$ is 1 to 4 provided that $m$ is 1 if Y is nitro or phenyl, and $n$ is 1 to 2. Moreover, this invention is concerned with a, process for preparing said dyestuffs.

In German Auslegeschrift 1,168,862 compounds of the quinophthalone series are disclosed as suitable for dyeing polyester fibres.

From substituted quinophthalones 4-bromo-3-hydroxy-quinophthalone, a dyestuff of particular fastness to light in regard to polyester fibres and of moderate fastness to thermofixing is described in British specifications Nos. 865,308 and 1,036,389.

It has now been found that new dyestuffs fast to thermofixation belonging to the quinophthalone series and corresponding to the general formula

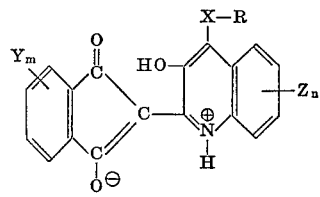

in which X represents an oxygen or sulfur atom, R represents an aryl radical, an aliphatic or cycloaliphatic radical or a heterocyclic ring, Y represents a hydrogen or halogen atom, a nitro group or a phenyl radical, Z stands for a hydrogen or halogen atom, $m$ is an integer form 1 to 4 and $n$ is one or two are obtained by reacting 4-halogeno-3-hydroxy-quinophthalones of the general formula

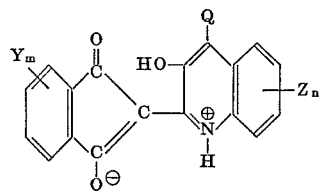

in which Q is a chlorine or bromine atom and Y, Z, $m$ and $n$ are defined as above (a) with compounds of the general formula

R—XH in which R and X have the meanings given above, in the presence of alkaline agents, or (b) with compounds of the formula R—XMe in which Me stands for an alkali metal atom or a radical of a tertiary base.

The aryl radical R in the above-identified formulae, preferably, is a phenyl, naphthyl, anthracenyl, fluorenyl, anthraquinonyl or pyrenyl radical. Said radicals may carry one or more substituents such, for example, as hydroxy, alkoxy, aryloxy, preferably phenoxy, nitro, keto, aldehyde, carboxyl, carboalkoxy, amino, alkyl, phenyl, naphthyl or benzyl groups or halogen atoms. The aliphatic or cycloaliphatic radical R which, preferably, is an alkyl or cycloalkyl group or the heterocyclic ring R in the afore-said formulae may likewise carry substituents, for example, hydroxy, alkoxy, aryloxy, especially phenoxy, cyano, sulfonyl, amino or aryl groups, preferably phenyl or naphthyl groups or halogen atoms.

Suitable starting substances of the quinophthalone series are, for example the following:

4-bromo-3-hydroxy-quinophthalone,
4-chloro-3-hydroxy-quinophthalone,
4,5',6'-tribromo-3-hydroxy-quinophthalone,
4,4',5',6',7'-pentabromo-3-hydroxy-quinophthalone,
4-bromo-4',7'-dichloro-3-hydroxy-quinophthalone,
4-bromo-4',5',6',7'-tetrachloro-3-hydroxy-quinophthalone,
4-bromo-4'-fluoro-3-hydroxy-quinophthalone,
4-bromo-5'-nitro-3-hydroxy-quinophthalone,
4,6-dibromo-3-hydroxy-quinophthalone,
4-bromo-5,7-dichloro-3-hydroxy-quinophthalone and
4-bromo-5'-phenyl-3-hydroxy-quinophthalone.

As appropriate compounds of the formula R—XH there may be named for example phenol, alkyl phenols such as 4-hydroxy-toluene, halophenols, for example 4-bromo-phenol, 2-chloro-phenol, 4-fluorophenol, polyvalent phenols such as hydroquinone, hydroquino-monomethyl ether, nitrophenols, for example 4-nitrophenol, hydroxyaldehydes or ketones such as 3-hydroxy-benzaldehyde, 4-hydroxy-acetophenone, hydroxy-carboxylic acids or esters for example 4-hydroxy-benzoic acid, 4-hydroxy-benzoic acid ethyl ester, aminophenols such as 4-aminophenol, 4-methylamino-phenol, 4-dimethylamino-phenol, 4-hydroxy-diphenylamine, hydroxy-diphenyl-methane for example, 4-hydroxy-diphenyl-methane, 4',4'' - dihydroxy-diphenyl-propane (2,2), hydroxy-diaryls such as 4-hydroxy-diphenyl, 2-hydroxy-diphenyl, naphthols, for example, 1-naphthol, 2-naphthol, halonaphthol- for example, 2-chloro-1-naphthol, 4-bromo-1-naphthol, 1-hydroxy-anthracene, 1-hydroxy-anthraquinone, 9-hydroxyfluorene 3 - hydroxy-pyrene alcohols such as methanol, ethanol, amylalcohols, hexanol (1), dodecanol-(1), ethylene glycol, diethylglycol- hexandiol-(1,6), glycerin, ethyleneglycol-monoethyl ether, diethylene-glycol-monoethyl-ether, 3-chloro-propanol-(1), 3-hydroxy-propionitrile, chlorobenzene-4-$\beta$-hydroxy-ethyl-sulfone, 2-amino-ethanol-(1), 2-dimethyl-amino-ethanol-(1), benzylalcohol, hexahydro-benzyl alcohol heterocyclic hydroxy compounds such as 6-hydroxy-quinoline, 2-hydroxy pyridine, 5-nitro-2-hydroxy-pyridine, 1-(3'-hydroxy-phenyl)-3-methylpyrazolone-(5), N-$\beta$-hydroxy-ethyl-morpholine, mercapto compounds, for example thiophenol, 2,5-dichloro-thiophenol, 4-nonyl-thio-phenol, thiophenol-2-carboxylic acid. 2-amino-3-mercap-totoluene, ethyl-mercaptane, dodecanthiol, 5-nitro-2-mercapto-benzimidazol, 5-mercapto-1-phenyl-tetrazol, 2-mercapto-benzoxazol and 2-mercapto-benzthiazol.

As alkaline media, for example alkali metal hydroxides such as sodium or potassium hydroxide or anhydrous alkali metal carbonates, for example sodium or potassium carbonate or anhydrous tertiary bases such as trimethyl amine or tributyl amine, may be used.

The reaction is suitably conducted in an excess of a hydroxy or mercapto compound in the melt at or above melting temperature, advantageously in the range of from 100° to 200° C., preferably 120° and 160° C. When no more starting material can be ascertained in the melt, the mixture is poured if desired or required after distilling off the excess of hydroxy or mercapto compound, in water or a lower alcohol. The precipitated dyestuff is drawn off, washed and dried.

In many cases it is advantageous to perform the reaction in a solvent. Appropriate solvents are those having a sufficient dissolving power for alkali metal salts of hydroxy or mercapto compounds. As such for example dialkyl-formamides, for example dimethyl-formamide, N-alkyl-acetamides such as N-methyl-acetamide, phosphoric acid-tris-dialkylamide, for example phosphoric acid tris-dimethylamide and dialkyl sulfoxides, for example dimethyl sulfoxide may be used. When applying one of these solvents it is of advantage to first form the salt from the corresponding hydroxy or mercapto compound and the alkaline agent and distill off the water thus formed by means of an entraining agent. As entraining agents aromatic or cycloaliphatic hydrocarbons, for example toluene, xylene or cyclohexane are suited. After the salt formation, the entraining agent itself is distilled off, the quinophthalone derivative is added and the whole heated to the reaction temperature, advantageously 100°–200° C., preferably 100°–140° C. The course of the reaction is easy to follow by means of thin layer chromatography. When operating with solvents the dyestuff is, advantageously isolated by pouring the reaction mixture in water, a dilute mineral acid or a lower alcohol and filtering off the precipitated dyestuff.

The dyestuffs obtained by the instant process yield on synthetic fibrous materials, especially those consisting of polyethylene terephthalates, yellow dyeings having good fastness to solvents and light and remarkably good fastness to thermofixation and ironing. They are superior to dyeings produced with 3-hydroxy-quinophthalone or 4-bromo-3-hydroxy-quinophthalone in regard to better fastness to thermofixation.

In order to produce fast dyeings the polyester materials are treated with said dyestuffs in the presence of carriers at between 80° and 110° C. or, in the absence thereof, at between 110° and 140° C. To produce prints, aqueous printing pastes are printed on the polyester tissue which is, subsequently steamed, in the presence of a carrier, at between 95° and 110° C. or, without a carrier, at between 120° and 140° C.

The dyeing or printing may also be performed according to the so-called thermosol process wherein the padded or printed fabric is subjected, shortly, to a treatment by dry heat at between 180° and 200° C.

The dyestuffs of the invention may likewise be applied with good result to dyeing polyethylene-terephthalates in the spinning solution.

The following examples are to illustrate the invention but they are not intended to limit it thereto. The parts and percentages are by weight unless otherwise stated.

EXAMPLE 1

150 parts of phenol were melted and mixed at 100° C., with 7.5 parts of potassium hydroxide and 26 parts of 4-bromo-3-hydroxy-quinophthalone. This mixture was, subsequently, heated to 140° C. until no more starting substance was ascertained in a sample. The melt was poured in 500 parts of methanol, the dyestuff was drawn off, washed with methanol and dried. 22 parts of 4-phenoxy-3-hydroxy-quinophthalone of the formula

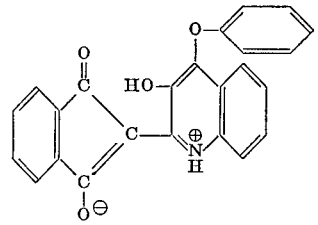

were obtained melting at 244°–246° C. The yield amounted to 82% of the theory. The dyestuff dyed polyester fibres yellow shades having good fastness to light and wet processing and remarkably good fastness to thermofixation.

EXAMPLE 2

15 parts of 4-hydroxy-toluene, 7.5 parts of potassium hydroxide, 150 parts of dimethyl-formamide and 100 parts of cyclohexane were heated to the boil, the water which formed being distilled off via a water separator. When no more water formed, the cyclohexane was distilled off. Then 26 parts of 4-bromo-3-hydroxy-quinophthalone were added and the mixture was heated to the boil until in a sample no more starting substance could be ascertained. The batch was poured into 500 parts of water and the whole rendered kongo acid with dilute sulfuric acid. Subsequently, the product was suction-filtered, washed and dried. 22 parts of the dyestuff corresponding to the formula

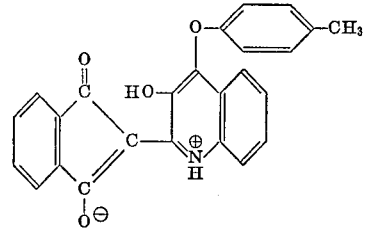

and melting at 265°–266° C. were obtained, a yield amounting to 79% of the theory. The dyestuff dyed polyester fibres yellow shades of very good fastness properties.

EXAMPLE 3

50 parts of 4-chlorophenol were melted and mixed at 100° C. with 3 parts of anhydrous potassium carbonate and 9 parts of 4-bromo-5'-nitro-3-hydroxy-quinophthalone. This mixture was subsequently heated to 160° C. until in a sample no more starting substance could be ascertained by thin-layer-chromatography. The melt was poured in 200 parts of methanol. The dyestuff was suction-filtered, washed and dried. 8 parts of 4-(4''-chlorophenoxy)-5'-nitro-3-hydroxy-quinophthalone of the formula

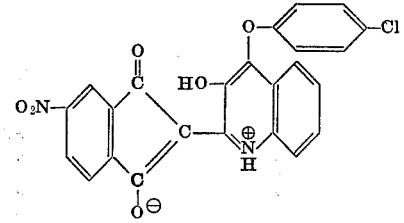

were obtained melting at 360° C. The yield amounted to 79.5% of the theory. The dyestuff dyed polyester fibres yellow shades having excellent fastness properties.

EXAMPLE 4

50 parts of 4-hydroxy-anisol were melted and mixed with 4 parts of anhydrous tributyl-amine and 9 parts of 4-bromo-3-hydroxy-quinophthalone at 100° C. This mixture was, subsequently, heated to 150° C. until in a sample no more starting substance was traceable. The melt was poured in 200 parts of methanol. The dyestuff was drawn off, washed and dried. 8 parts of 4-(4'-methoxy-phenoxy)-3-hydroxy-quinophthalone of the formula

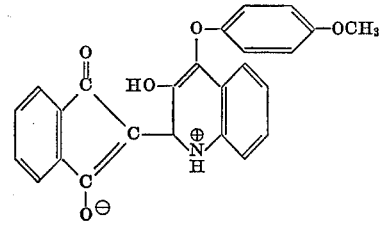

were obtained melting at 236° to 238° C. The yield amounted to 79% of the theory. The dyestuff dyed polyester fibres yellow shades possessing excellent fastness properties.

EXAMPLE 5

150 parts of methanol, 7.5 parts of potassium hydroxide and 26 parts of 4-bromo-3-hydroxy-quinophthalone were heated in an autoclave to 150° C. until no more starting substance was traceable in a sample. The content of the autoclave was subsequently drawn off, washed with methanol and dried. 21 parts of 4-methoxy-3-hydroxy-quinophthalone of the formula

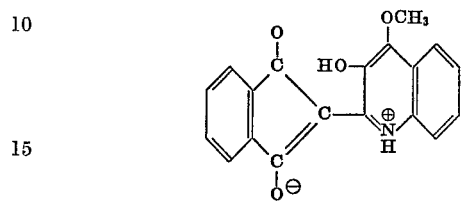

were obtained melting at 273° C. The yield amounted to 93% of the theory. The dyestuff dyed polyester fibres yellow shades having good fastness properties.

EXAMPLE 6

150 parts of 2,5-dichloro-thiophenol, 7.5 parts of potassium hydroxide and 26 parts of 4-bromo-3-hydroxy-quinophthalone were heated for 4 hours to 150° C. The mixture was, subsequently, poured into 500 parts of methanol and suction-filtered. The product was washed and dried. 31.5 parts of 4-(2'5'-dichlorophenylmercapto)-3-hydroxy-quinophthalone of the formula

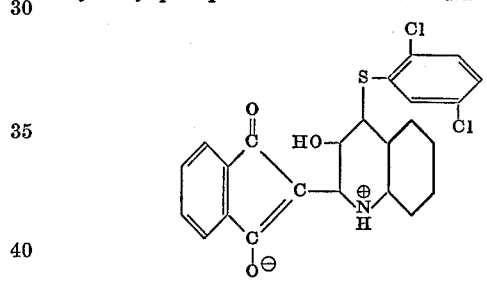

were obtained melting at 219° C. The yield amounted to 95% of the theory. The dyestuff dyed polyester fibres greenish yellow shades having excellent fastness properties.

The following table lists further dyestuffs obtainable by the methods described in Examples 1 to 6.

| Starting substance | Reacted with— | Dyestuff | Shade |
| --- | --- | --- | --- |
| 4-bromo-3-hydroxy-quinophthalone | 2-chlorophenol | 4-(2'-chlorophenoxy)-3-hydroxy-quinophthalone | Yellow. |
| Do | 4-chlorophenol | 4-(4'-chlorophenoxy)-3-hydroxy-quinophthalone | Do. |
| Do | 3-hydroxy-toluene | 4-(3'-methyl-phenoxy)-3-hydroxy-quinophthalone | Do. |
| Do | 4-bromophenol | 4-(4'-bromo-phenoxy)-3-hydroxy-quinophthalone | Do. |
| Do | 3-nitrophenol | 4-(3'-nitrophenoxy)-3-hydroxy-quinophthalone | Greenish yellow. |
| Do | Hydroquinone | 4-(4'-hydroxy-phenoxy)-3-hydroxy-quinophthalone | Yellow. |
| Do | 3-hydroxy-benzoic acid amide | 4-(3'-amino-carbonyl-phenoxy)-3-hydroxy-quinophthalone | Do. |
| Do | Ethyleneglycol | 4-(β-hydroxy-ethoxy)-3-hydroxy-quinophthalone | Do. |
| Do | Diethyleneglycol | 4-[β-(β'-hydroxy-ethoxy)-ethoxy]-3-hydroxy-quinophthalone | Do. |
| Do | 2-hydroxy-pyridine | 4-(2'-pyridyl-oxy)-3-hydroxy-quinophthalone | Do. |
| Do | Thiophenol | 4-phenyl-mercapto-3-hydroxy-quinophthalone | Greenish yellow. |
| Do | 4-hydroxy-diphenyl-methane | 4-(4'-benzyl-phenoxy)-3-hydroxy-quinophthalone | Yellow. |
| Do | 3-hydroxy-propionitrile | 4-(β-cyanoethoxy)-3-hydroxy-quinophthalone | Do. |
| Do | 2-dimethylamino-ethanol | 4-(β-dimethylamino-ethoxy)-3-hydroxy-quinophthalone | Do. |
| Do | Ethyleneglycol-monoethyl ether | 4-(β-ethoxy-ethoxy)-3-hydroxy-quinophthalone | Do. |
| Do | 2-chloro-ethanol | 4-(β-chloro-ethoxy)-3-hydroxy-quinophthalone | Do. |
| Do | Hexandiol-(1,6) | 4-(ω-hydroxy-hexoxy)-3-hydroxy-quinophthalone | Do. |
| Do | Hexahydrobenzyl alcohol | 4-hexahydro-benzyloxy-3-hydroxy-quinophthalone | Do. |
| Do | 3-hydroxy-benzaldehyde | 4-(3'-formyl-phenoxy)-3-hydroxy-quinophthalone | Do. |
| Do | 4-hydroxy-acetophenone | 4-(4'-acetyl-phenoxy)-3-hydroxy-quinophthalone | Do. |
| Do | 4-hydroxy-benzoic acid ethyl ester | 4-(4'-carbethoxy-phenoxy)-3-hydroxy-quinophthalone | Do. |
| Do | 4-dimethyl-amino-phenol | 4-(4'-dimethylamino-phenoxy)-3-hydroxy-quinophthalone | Do. |
| Do | Thiophenol-2-carboxylic acid | 4-(2'-carboxy-phenylmercapto)-3-hydroxy-quinophthalone | Do. |
| 4'-chloro-4-bromo-3-hydroxy-quinophthalone | Phenol | 4'-chloro-4-phenoxy-3-hydroxy-quinophthalone | Do. |
| 5'-phenyl-4-bromo-3-hydroxy-quinophthalone | 4-hydroxy-toluene | 5'-phenyl-4-(4''-methyl-phenoxy)-3-hydroxy-quinophthalone | Do. |
| 4,4',5',6',7'-pentabromo-3-hydroxy-quinophthalone | 4-chlorophenol | 4',5',6',7'-tetrabromo-4-(4''-chloro-phenoxy)-3-hydroxy-quinophthalone | Do. |

| Starting substance | Reacted with— | Dyestuff | Shade |
|---|---|---|---|
| 4,6-dibromo-3-hydroxy-quinophthalone | 4-bromophenol | 6-bromo-4-(4'-bromo-phenoxy)-3-hydroxy-quinophthalone. | Yellow. |
| 4-chloro-3-hydroxy-quinophthalone | 4-hydroxy-diphenyl-ether | 4-(4'-phenoxy-phenoxy)-3-hydroxy-quinophthalone. | Do. |
| 4-bromo-3-hydroxy-quinophthalone | Dodecanol-(1) | 4-dodecyloxy-3-hydroxy-quinophthalone | Do. |
| Do | Dodecanthiol-(1) | 4-dodecyl-mercapto-3-hydroxy-quinophthalone | Do. |
| Do | 4-tert.-butyl-phenol | 4-(4'-tert.-butyl-phenoxy)-3-hydroxy-quinophthalone. | Do. |
| Do | 4-nonyl-thiophenol | 4-(4'-nonyl-phenylmercapto)-3-hydroxy-quinophthalone. | Do. |
| Do | 4-chlorophenyl-β-hydroxy-ethyl-sulfone | 4-(β-(4'-chlorophenyl-sulfonyl)-ethoxy)-3-hydroxy-quinophthalone. | Do. |
| Do | 2-hydroxy-diphenyl | 4-(2'-phenyl-phenoxy)-3-hydroxy-quinophthalone | Do. |
| Do | 2-naphthol | 4-(2'-naphthoxy)-3-hydroxy-quinophthalone | Do. |
| Do | 2-chloro-1-naphthol | 4-(2'-chloro-1'-naphthoxy)-3-hydroxy-quinophthalone. | Do. |
| Do | 5-nitro-2-mercapto-benzimidazol | 4-(5'-nitro-benzimidazolyl-2'-mercapto)-3-hydroxy-quinophthalone. | Do. |
| Do | 5-nitro-2-hydroxy-pyridine | 4-(5'-nitro-pyridyl-2'-oxy)-3-hydroxy-quinophthalone. | Do. |
| Do | 6-hydroxy-quinoline | 4-(chinolyl-6'-oxy)-3-hydroxy-quinophthalone | Do. |
| Do | 2-mercapto-benzoxazol | 4-(benzoxazolyl-2'mercapto)-3-hydroxyquinophthalone. | Do. |
| Do | 5-mercapto-1-phenyltetrazol | 4-(1'-phenyl-tetrazolyl-5'mercapto)-3-hydroxy-quinophthalone. | Do. |
| Do | N-β-hydroxy-ethyl-morpholine | 4-(β-N-morpholinyl-ethoxy)-3-hydroxy-quinophthalone. | Do. |
| Do | 2-mercapto-benzthiazol | 4-(benzthiazolyl-2'-mercapto)-3-hydroxy-quinophthalone. | Do. |
| Do | 3-hydroxy-pyrene | 4-(pyrenyl-3'-oxy)-3-hydroxy-quinophthalone | Do. |
| Do | 1-hydroxy-anthracene | 4-(anthracenyl-1'-oxy)-3-hydroxy-quinophthalone. | Do. |
| Do | Hydroquinone-mono-β-hydroxy-ethyl ether | 4-[4'-(β-hydroxy-ethoxy)-phenoxy]-3-hydroxy-quinophthalone. | Do. |
| Do | Pyrocatechol-mono-β-hydroxy-ethyl ether | 4-[2'-(β-hydroxy-ethoxy)-phenoxy]-3-hydroxy-quinophthalone. | Do. |
| Do | 4-(β-hydroxy ethoxy)-thiophenol | 4-[4'-(β-hydroxy-ethoxy)-phenylmercapto]-3-hydroxy-quinophthalone. | Do. |
| Do | Resorcinol-mono-α,α,β,β-tetrafluoro-ethyl ether | 4-[3'-(α,α,β,β-tetrafluoroethoxy)-phenoxy]-3-hydroxy-quinophthalone. | Do. |
| Do | 4-butoxy-phenol | 4-(4'-butoxy-phenoxy)-3-hydroxy-quinophthalone-hydroxy-quinophthalone. | Do. |
| Do | 4-fluorophenol | 4-(4'-fluorophenoxy)-3-hydroxy-quinophthalone | Do. |
| Do | Phenyl-β-hydroxy-ethylsulfone | 4-(β-phenylsulfonyl)-ethoxy-3-hydroxy-quinophthalone. | Do. |
| Do | Mercapto-cyclohexane | 4-cyclohexyl-mercapto-3-hydroxy-quinophthalone. | Do. |
| 4-bromo-5,7-dichloro-3-hydroxy-quinophthalone | Phenol | 4-phenoxy-5,7-dichloro-3-hydroxy-quinophthalone. | Do. |

We claim:

1. A dyestuff of the formula

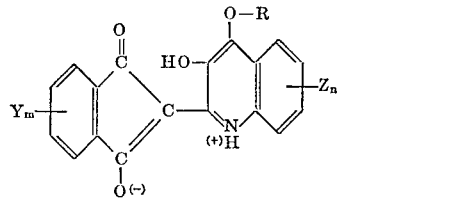

wherein R is cyclohexylmethyl, phenyl or phenyl substituted by one or two of the groups chlorine, bromine, alkyl of 1 to 4 carbon atoms or alkoxy of 1 to 4 carbon atoms, Z is hydrogen, chlorine or bromine, Y is hydrogen, chlorine, bromine, nitro or phenyl, m is an integer 1 to 4 (1 if Y is nitro or phenyl) and n is an integer 1 or 2.

2. The dyestuff of the formula

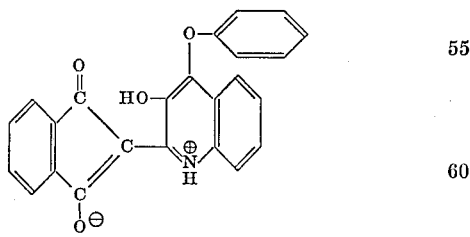

3. The dyestuff of the formula

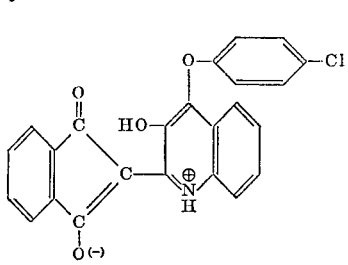

4. The dyestuff of the formula

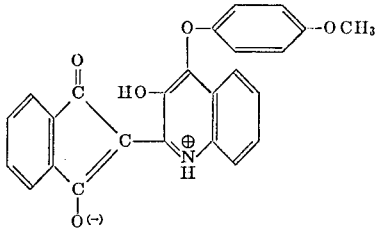

5. The dyestuff of the formula

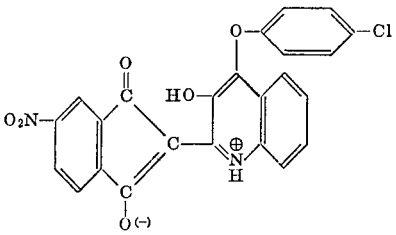

References Cited

UNITED STATES PATENTS

| | | | |
|---|---|---|---|
| 3,036,876 | 5/1962 | Schoellig | 260—289 X |
| 2,858,315 | 10/1958 | Matter | 260—289 |
| 3,320,261 | 5/1967 | Lorenz | 260—283 |
| 3,472,859 | 10/1969 | Lesher et al. | 260—287 |

FOREIGN PATENTS

| | | | |
|---|---|---|---|
| 1,523,982 | 3/1968 | France | 260—289 |

DONALD G. DAUS, Primary Examiner

U.S. Cl. X.R.

8—55; 260—247.5 B, 283 S